(12) United States Patent
Ziolkowski et al.

(10) Patent No.: US 9,000,778 B2
(45) Date of Patent: Apr. 7, 2015

(54) COMMUNICATION METHOD FOR MONITORING PIPELINES

(75) Inventors: Christopher John Ziolkowski, Elmhurst, IL (US); James Emerson Huebler, Brookfield, IL (US); Michael Christian Mensinger, Jr., Darien, IL (US)

(73) Assignee: Gas Technology Institute, Des Plaines, IL (US)

( * ) Notice: Subject to any disclaimer, the term of this patent is extended or adjusted under 35 U.S.C. 154(b) by 639 days.

(21) Appl. No.: 13/209,512

(22) Filed: Aug. 15, 2011

(65) Prior Publication Data

US 2013/0043887 A1    Feb. 21, 2013

(51) Int. Cl.
*G01R 27/02* (2006.01)
*F17D 5/00* (2006.01)
*G01V 15/00* (2006.01)

(52) U.S. Cl.
CPC . *F17D 5/00* (2013.01); *G01V 15/00* (2013.01)

(58) Field of Classification Search
CPC ........ G01R 27/02; G01R 27/26; G01R 27/28; G01R 1/30; G01R 25/00
USPC ......... 324/633, 326, 649, 600, 650, 615, 638, 324/700, 71.2, 73, 204, 422; 73/40.5 R
See application file for complete search history.

(56) References Cited

U.S. PATENT DOCUMENTS

| | | | | |
|---|---|---|---|---|
| 5,664,929 A * | 9/1997 | Esaki et al. | | 414/398 |
| 5,672,972 A * | 9/1997 | McCoy et al. | | 324/393 |
| 5,792,337 A * | 8/1998 | Padovani et al. | | 205/775.5 |
| 6,614,354 B2 | 9/2003 | Haines et al. | | |
| 6,785,618 B2 | 8/2004 | Kechter et al. | | |
| 7,168,487 B2 * | 1/2007 | Salamitou et al. | | 166/250.11 |
| 7,908,118 B2 | 3/2011 | Trowbridge, Jr. et al. | | |
| 8,056,623 B2 * | 11/2011 | Schmitt et al. | | 166/250.01 |
| 2005/0264293 A1 * | 12/2005 | Gao et al. | | 324/326 |
| 2006/0170535 A1 * | 8/2006 | Watters et al. | | 340/10.41 |
| 2007/0118335 A1 * | 5/2007 | Andarawis et al. | | 702/188 |
| 2007/0126421 A1 * | 6/2007 | Barnes | | 324/238 |
| 2007/0255144 A1 * | 11/2007 | Tulkki et al. | | 600/481 |
| 2008/0234599 A1 * | 9/2008 | Chiao et al. | | 600/547 |
| 2009/0224919 A1 * | 9/2009 | Angell et al. | | 340/572.1 |
| 2009/0228071 A1 * | 9/2009 | Bourget | | 607/60 |
| 2010/0052704 A1 * | 3/2010 | Fay et al. | | 324/700 |

FOREIGN PATENT DOCUMENTS

WO    WO2010097095    9/2010

* cited by examiner

*Primary Examiner* — Arleen M Vazquez
*Assistant Examiner* — Dominic Hawkins
(74) *Attorney, Agent, or Firm* — Pauley Petersen & Erickson

(57) ABSTRACT

A method for underground pipeline monitoring in which a continuous alternating electrical current having a current frequency in a range of about 1 kHZ to about 8 kHz is imparted onto a pipeline, producing an alternating magnetic field at the current frequency along the pipeline. Distributed along the pipeline is a network of RFID tag sensors which absorb an amount of energy from the alternating magnetic field. The impedance of the sensors is modulated, producing a modulated sensor impedance which is detected at a location proximate the location at which the continuous alternating electrical current is imparted onto the pipeline.

24 Claims, 5 Drawing Sheets

Base Data

Modulated Data

Carrier With Data Modulation

COMMUNICATION METHOD FOR MONITORING PIPELINES

BACKGROUND OF THE INVENTION

The U.S. Government has a paid-up license in this invention and the right in limited circumstances to require the patent owner to license others on reasonable terms as provided for by the terms of Grant No. DTPH56-09-G-PHPD01 awarded by the U.S. Department of Transportation.

FIELD OF THE INVENTION

This invention relates to a method and system for monitoring underground pipelines. In one aspect, this invention relates to a communication method and system utilizing underground pipelines as conduits for transmission of data and other information relating to pipeline condition and status. In one aspect, this invention relates to the use of radio frequency identification (RFID) coils for communication of data and other information along an underground pipeline. In yet another aspect, this invention relates to the use of sensors to track pipeline properties.

DESCRIPTION OF RELATED ART

Underground pipelines are widely used to transport a variety of fluids, including oil, natural gas, water, etc., from one place to another. Such underground systems are subject to damage from a variety of sources, both naturally occurring and man-made. For example, subsidence of the soil, local construction projects, seismic activity, and weather can all lead to defects and anomalies in the pipeline. Also, harsh environments can cause pipelines to move gradually over time, leading to defects, cracks, leaks, bumps, and other anomalies, within the interior of the pipeline.

Damage to pipelines can be detected in a variety of ways including detection of the substance that escapes from the pipeline as the result of the damage, pressure drops in the pipeline, and impacts on the pipeline. However, continuous monitoring of long pipelines, whether for seismic events or impacts occurring during excavation in proximity to the pipeline, is not a simple task.

There are several systems and methods known to those skilled in the art for continuously monitoring the condition of underground pipelines. One such system and method involves acoustic monitoring which may be carried out by a variety of acoustic sensors/detectors, such as geophones, accelerometers and the like. Other such systems involve the measurement of strain on the pipeline—some at a number of points along the pipeline and others on a continuous basis.

For communication purposes, using acoustic transmission on a pipeline has been found to be unacceptable due to a relatively short transmission range, thereby requiring transmitting data from sensor to sensor along the pipeline in a manner analogous with some wireless networks. As a result, the energy required for the communication is too much to be provided by battery power at an acceptable cost.

AM frequency signals can be superimposed on the electrical grid for broadcast to a limited area, a system used by some universities for local radio broadcast. However, there is no communication of data back from the receivers and the radio frequencies used limit the range of transmission to relatively short distances.

A mesh network of RFID sensors with wireless communication at 2.4 GHz has been developed in which ultrasonic sensors are used for measuring wall thicknesses. The system requires power and an above ground antenna. However, if such a system were to be used on a pipeline, the exposed sensors, power supply and wireless system would all be subject to vandalism and other forms of damage.

Passive RF tags have been used for the location of buried objects for several decades. These RF tags all operate in the spectrum below 160 kHz, the region allocated by the U.S. Federal Communication Commission (FCC) for pipe tracing and locating. However, these passive tags lack the "ID" function as a result of which the tags can be located, but they do not communicate any data back.

There is a substantial amount of work that has been carried out using RFID tags. Most applications operate in air with a short distance between the interrogator and the RFID tag of a few inches or feet and at high frequencies (MHz) where the transfer of energy is very efficient. However, it is generally believed that RFID tags will not operate in soil because the high frequencies at which they operate attenuate too quickly in the soil. Recently, there have been a few applications of RFID tags in soil at 131 kHz using the Rubee standard, but their range is limited to relatively short distances (less than about 100 feet).

TDR (Time Domain Reflectometry) is among the more advanced methods of pipeline monitoring. In TDR, coaxial cables are inserted and fixed into a drill-hole. The system then transmits a pulse of energy as a waveform and measures reflections of this transmission from which the distance to a disturbance within the pipeline can be determined.

Optical Time Domain Reflectometry, or OTDR, is a more advanced version of the TDR system. OTDR is very useful in monitoring ground motion along pipeline routes, and can identify motion in the pipeline's geotechnical environment, thereby helping to avert failure. The network of cables also acts as an anti-intrusion measure. An OTDR reader allows operators to monitor the pipeline and to alert them to any breaks or inconsistencies in it. Operators can then locate the disruption to within a few feet, alert a maintenance crew and even shut the pipeline down before an actual rupture occurs. OTDR systems are effective over distances of up to 25 kilometers.

However, none of the products currently available for continuous pipeline monitoring in a practical manner are acceptable to utilities in that they require too much energy to power the sensors and they are too expensive. Keys to a practical system are the ability to locate sensors at any location next to and/or attached to the pipeline and transmit the data to a central location without connecting each sensor to the power grid, without utilizing an excessive amount of batteries, and without utilizing hardware above ground. More particularly, it is desired that each communication node/sensor last for a period of 10 to 20 years without a battery replacement.

SUMMARY OF THE INVENTION

The invention described herein is a method for underground pipeline monitoring in which a continuous alternating electrical current having a current frequency of less than or equal to about 30 kHz, preferably in the range of about 1 kHz to about 30 kHz, is superimposed onto a pipeline, producing an alternating magnetic field at the current frequency along the pipeline. Distributed along the pipeline is a network of sensors which absorb an amount of energy from the alternating magnetic field, i.e., current draw. The impedance of the sensors is modulated, preferably by modulating the sensor current draw, producing a modulated sensor impedance which is detected at a location proximate the location at which the continuous alternating electrical current is superimposed onto the pipeline.

The system by which the method of this invention may be implemented comprises three primary components—an interrogator which superimposes a continuous alternating electrical current (also referred to herein as a carrier current) onto the pipeline and detects the modulated signal from the sensor, known as backscatter modulation, the pipeline which conducts the continuously present carrier current, and the sensors which measure a parameter about the pipeline and communicate information about the measured parameter back to the interrogator. In accordance with a particularly preferred embodiment, the sensors are radio frequency identification (RFID) tag sensors disposed in the ground at a distance sufficient from the pipeline to enable monitoring of the pipeline in accordance with the designated purpose of the sensor, e.g. pipeline location, pipeline leakage, etc. Use of the system for implementation of the method of this invention provides the benefits of a network of continuously active sensors buried along the pipeline right-of-way, a communication means for collecting the sensor data, a continuously present locating signal on the pipeline or tracer wire associated with the pipeline, continuous monitoring of the pipeline or tracer wire impedance to detect pipeline damage, and means for correlating sensor data such as impedance, impact, and pipeline cathodic protection potential. Because of the way in which the two-way communication of the method of this invention is carried out, the use of battery powered sensors buried next to the pipeline is possible. This is because battery power requirements are modest, as a result of which battery lifetimes can approach twenty years. In addition, unlike conventional sensors which utilize higher frequencies, the frequencies employed in this invention are in the range of about 1 kHz to about 15 kHz, preferably in the range of about 5 kHz to 10 kHz, and more preferably about 8 kHz.

Additional benefits of this invention include the fact that, with the two-way communication and addressable RFID tags enabled by the invention, a sensor may be added at any location along the pipeline at any time; and because RFID tags are low cost, they may be abandoned in place in the event of failure. In addition, the invention provides a constantly present pipe location signal as a result of which low cost sensors may be mounted on construction equipment and used to provide an alert when a pipe is being approached. Such an approach has not heretofore been possible because there has been no practical way to have the signal present at all times.

BRIEF DESCRIPTION OF THE DRAWINGS

The objects and features of this invention will be better understood from the following detailed description taken in conjunction with the drawings wherein.

DETAILED DESCRIPTION OF THE PRESENTLY PREFERRED EMBODIMENTS

The fundamental feature of this invention is the use of a pipeline or, in the case of plastic pipes, a tracer wire, as a backbone for a communication system that networks sensors to monitor the pipeline. This invention features the use of a network of continuously active sensors buried along a right-of-way, a communication network method to collect the sensor data, a continuously present locating signal on the pipeline or tracer wire, continuous monitoring of the pipeline or tracer wire impedance to detect damage, and means to correlate sensor data including, but not limited to, impedance, impact, and pipe potential, all of which contribute to reducing the risk of excavation damage to pipelines. It is to be understood that the terms "pipeline" and "pipe", which are used interchangeably herein, are made of electrically conductive materials or, in the case of electrically non-conductive pipes, such as plastic pipe, are provided with some form of electrical conductivity means, such as a tracer wire. In addition, the invention may employ other sensors to monitor the health of the pipeline and obtain other information about the pipeline.

Figure 1:
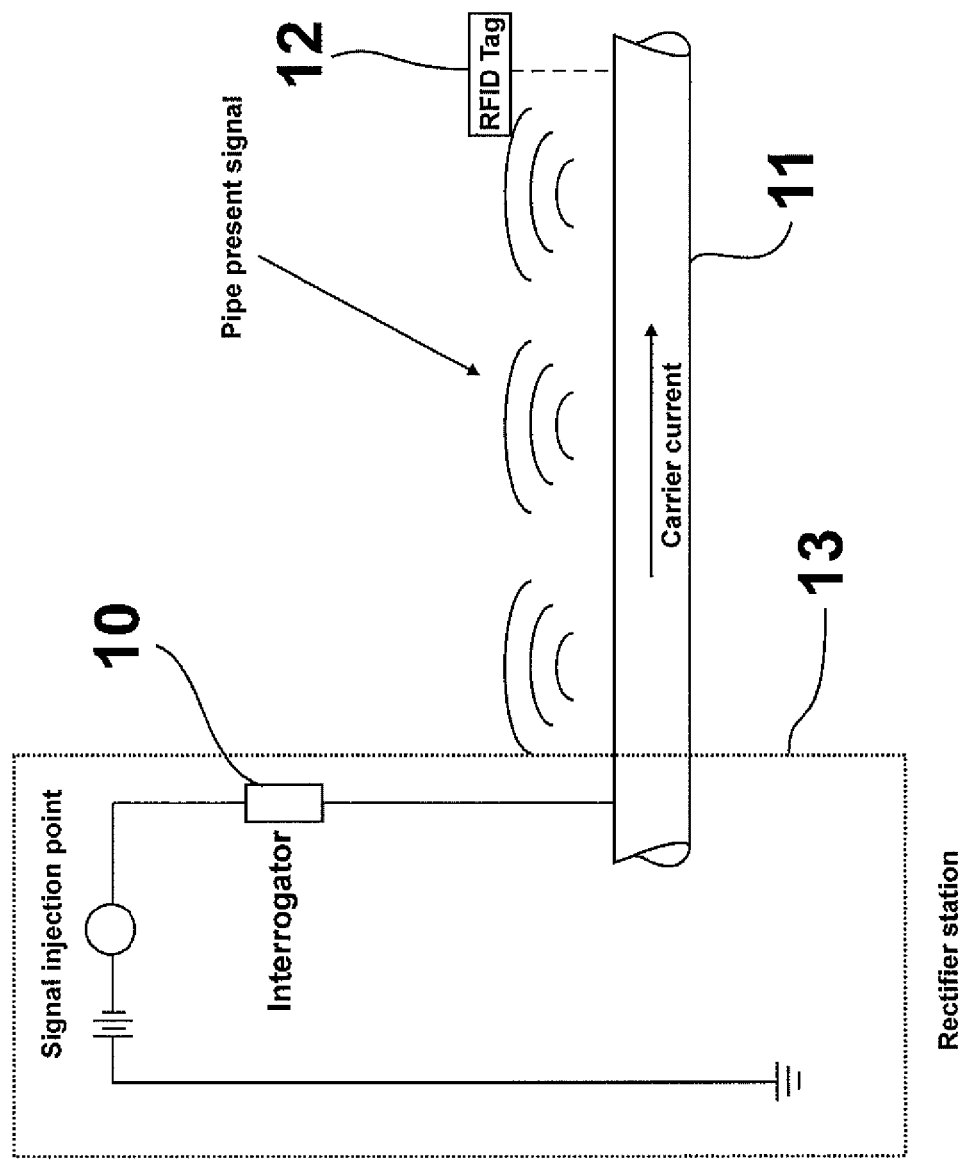
FIG. 1 is a schematic diagram of a system for monitoring pipelines in accordance with one embodiment of this invention.

The method of this invention utilizes a system, shown in FIG. 1, comprising an interrogator 10 which superimposes an electrical current (carrier current) onto a pipeline 11 and detects a backscattered modulation signal, the pipeline which conducts the continuously present carrier current, and radio frequency identification tag sensors 12 which measure a parameter about the pipeline and communicate information back to the interrogator. In accordance with one preferred embodiment, the RFID tag sensors are located next to, but not in contact with, the pipeline. In accordance with another embodiment of this invention, the sensors are attached to the pipeline.

In actuality, the system of this invention utilizes a pipeline to soil circuit as the antenna for the interrogator. This is in contrast to conventional RFID systems in which multi-turn coils are used as antennas for both the interrogator and the RFID tag being interrogated. It is well established that performance of a remote RFID tag antenna is proportional to the magnetic flux driven through the RFID antenna. The pipeline to soil circuit may be regarded as a single-turn antenna coil for the interrogator having an extended (long and narrow) cross-sectional area and the RFID antenna is a conventional multi-turn coil that is placed near the electrically conductive pipeline. This arrangement effectively places the RFID antenna coil, which is near the pipeline within the interrogator antenna "coil", effectively allowing the RFID tag to be in the near field of the interrogator antenna, i.e. transmit antenna, to maximize the flux linkage. It is also known that increasing the working frequency of an interrogation/RFID system increases the flux linkage between the interrogator and the RFID tag. In known systems utilizing multi-turn coils for both the interrogator and RFID antennas, the working frequency has been in the range of about 60 kHz to about 131 kHz, at which frequencies ranges of communication up to about 50 feet have been attained. It is well known, however, that lowering the working frequency will increase the propagation distance along the pipeline, but it will also reduce the linkage of energy to the RFID coil. It is, thus, surprising that operation at a frequency of 8 kHz, while permitting propagation over distances of more than a mile will still provide sufficient linkage of energy into the RFID antenna to provide the communication afforded by the method and system of this invention.

Although the interrogator may be located anywhere proximate the pipeline, an impressed current rectifier station 13, which is used in connection with cathodic protection of the pipeline, provides a convenient location for the interrogator as shown in FIG. 1. The interrogator superimposes an alternating current signal (carrier current) onto the pipeline, which alternating current creates an alternating magnetic field at the same frequency as the alternating current signal all along the pipeline. Each RFID tag comprises a coil of wire (inductor), a capacitor, and other identification (ID) circuitry. The resonant frequency of the tag, which is matched to the carrier current frequency, is determined by the values of the inductance and capacitance of the coil. The tag absorbs energy from the magnetic field created by the alternating carrier current. By modulating the impedance of the RFID coil, the amount of power absorbed by the tag, i.e., the current draw, changes, thereby changing the load impedance seen by the interrogator. The change in reflected impedance manifests itself as a variation in the current provided at the carrier frequency. As previously indicated, the process of monitoring the reflected impedance of the RFID tag seen at the interrogator is called backscatter modulation. Communication between the interrogator and the RFID tag sensor is created by appropriately varying the backscatter modulation.

One benefit of the method of this invention is that the majority of the energy for communications comes from the interrogator with very little energy being expended by the RFID tag sensor for communication. In ideal cases, energy absorbed by the RFID coil may be harvested to power the RFID tag. Accordingly, in accordance with one embodiment of this invention, a battery is used to power the microprocessor in the RFID tag, but is not used to power the communication. Such RFID tags are referred to as battery-assisted RFID tags. The battery can support sensors that are available at all times to monitor pipeline parameters. Microprocessors that require very little power to run are commercially available. When combined with the appropriate battery and intermittent operation, battery lifetimes as long as twenty years are possible. It is anticipated that, in the near future, all of the RFID tag power requirements may be met by harvesting of the energy absorbed by the RFID coil.

In accordance with one embodiment of this invention, data is communicated by sequentially modulating the backscatter signal from the RFID tag sensors between two different sensor resonant frequencies or current draws, where one sensor resonant frequency or current draw corresponds to a data "zero" and the other sensor resonant frequency or current draw corresponds to a data "one". The method of modulating the RFID coil is critical to successful operation of the method of this invention. In particular, a method is required that provides abrupt transitions between the data "zero" resonant frequency or current draw and the data "one" resonant frequency or current draw, exemplified by square wave signals, without using significant amounts of energy from the RFID tag itself.

One of the issues associated with pipeline monitoring is the high level of noise in the surrounding environment, including a substantial level of 60 Hz and harmonic electromagnetic signals. Harmonics as high as 960 Hz have been detected. In such environments, the signals generated by the modulation of the RFID coil may be partially or completely overwhelmed by the noise, potentially resulting in high error rates in the transmission of data or other information. For those applications in which data transmission rates may be low, immunity of the data transmission from noise may be improved by encoding the information transmitted. Encoding data for greater resistance to noise involves using more time or frequency spectrum for each data bit. The objective is to increase the energy per bit, which increases the signal to noise ratio (SNR) and decreases the bit error rate. There are a number of well-known encoding techniques for reducing data transmission error rates.

Figure 2:
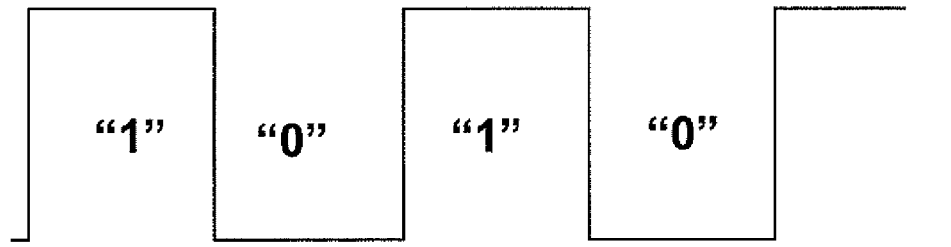
FIG. 2 is a diagram showing the technique of frequency shift keying for reducing data transmission error rates in accordance with one embodiment of this invention.
Figure 2:
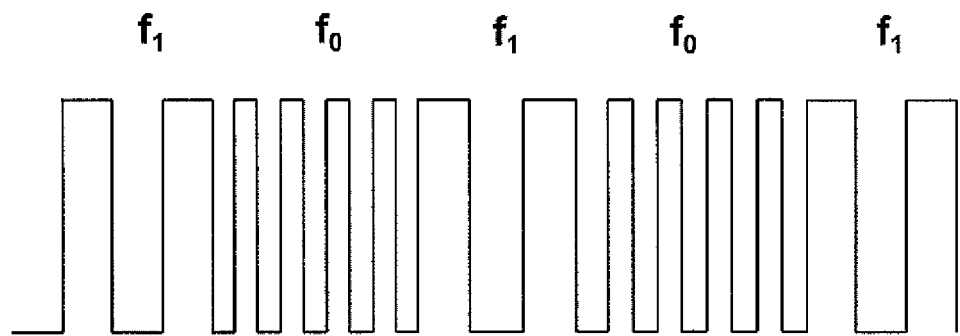
Figure 2:
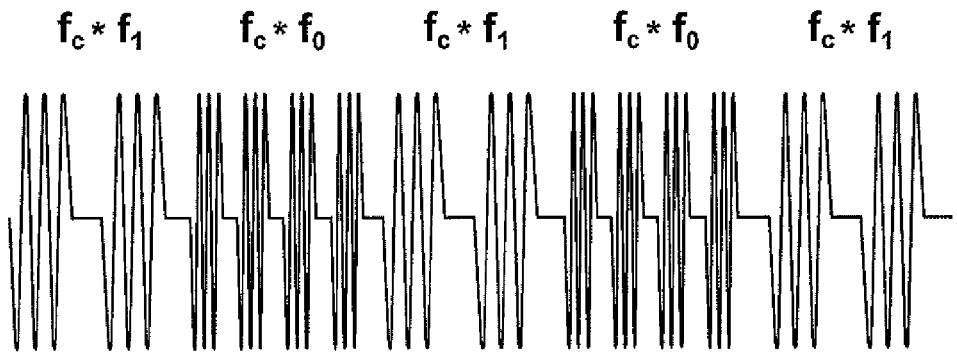

In accordance with one preferred embodiment of this invention, data transmission error rates are reduced using frequency shift keying (FSK), a method of transmitting digital signals in which two binary states, data logic "zero" (low) and data logic "one" (high), are each represented by an analog waveform (FIG. 2). Data logic "zero" is represented by a wave at a specific modulation frequency and data logic "one" is represented by a wave at a different modulation frequency. Thus, data logic "zero" corresponds to a first rate of modulation of the RFID coil and data logic "one" corresponds to a second rate of modulation of the RFID coil.

There is also a relationship between the FSK frequencies chosen to represent data logic "zero" and data logic "one" and the carrier frequency. The FSK frequencies should be at least an order of magnitude lower than the carrier frequency. Any practical detector requires several cycles of the carrier for the signal to be properly recognized. This relationship also holds between the base data rate and the FSK modulated data. That is, more cycles of the FSK frequency per bit produces greater noise immunity.

We have found that frequencies of 400 Hz (data logic "zero") and 500 Hz (data logic "one") are particularly beneficial, partly because they are sufficiently far from 60 Hz harmonics of 360 Hz, 420 Hz, 480 Hz, and 540 Hz. However, any frequencies which are sufficiently far from 60 Hz harmonics so as to be readily distinguishable from such harmonics and which provide detectable transitions may be used.

Figure 3:
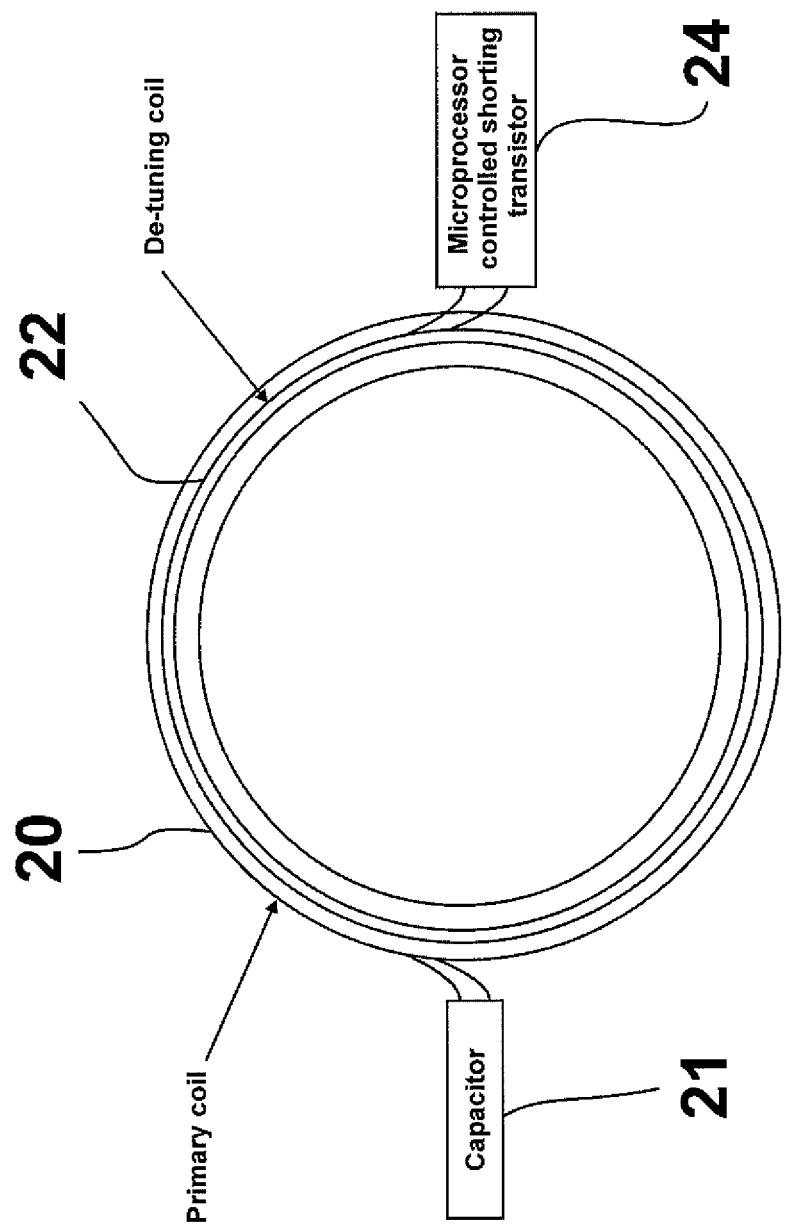
FIG. 3 is a schematic diagram of the primary and de-tuning coils of an RFID tag suitable for use in the claimed invention.

FIG. 3 is a schematic diagram of a two coil design for an RFID tag in accordance with one embodiment of this invention that has been shown to be very effective in trials. Primary coil 20 and capacitor 21 are tuned to a sensor resonant frequency substantially equal to the carrier current frequency. Secondary coil 22 is concentric with the primary coil and the two coils are only connected by their mutual inductance. Normally, the secondary coil is open-circuit, which, when open, has little effect on the resonance of the primary coil. However, when the secondary coil is electrically shorted, such as by microprocessor controlled shorting transistor 24, mutual inductance between the primary and secondary coils is activated and the impedance (current draw) of the primary coil (and, thus, the sensor resonant frequency) is changed. In accordance with one preferred embodiment of this invention, electrical shorting of the secondary coil is achieved using two metal-oxide-semiconductor field-effect transistors (MOSFET). MOSFETs are preferred for low power and high speed. Other methods, such as the use of resistive loading, may be employed for this purpose. The resulting mismatch between the carrier current, or initial sensor resonant frequency and the shifted resonant frequency of the primary coil results in less energy being extracted from the carrier current, thereby altering the impedance observed by the interrogator. This small change can be detected and is the source of the backscatter signal. The MOSFET is controlled by a microprocessor in the RFID tag which reduces the voltages seen by the transistor/microprocessor system. The number of turns in the secondary coil has a large effect on the sharpness of the resulting backscatter. In accordance with one preferred embodiment, the number of turns in the primary coil is about 300 with a ratio of primary coil turns to secondary coil turns of about 20:1.

Communication from the interrogator to the RFID tags may be accomplished in accordance with one embodiment of this invention by modulating the carrier current. Messages may be broadcast to all RFID tags, but because each RFID tag has a unique identifying address, communication to a specific RFID tag is readily discernible.

Microprocessors suitable for use in the method and system of this invention are readily available. Such microprocessors must be able to gather data from the RFID tag sensors, format the data, and send the data to internal modulation hardware to control the tuning/detuning rate of the RFID coil in such a manner that will minimize distortion to data signals. Preferred microprocessors include the additional capabilities of performing digital filtering and processing of the data, hardware that makes modulation schemes easy to implement, and operation at low voltages and/or power levels, typically less than about 3 volts. For example, the MSP line of microprocessors from Texas Instruments, Dallas, Tex. are suitable for use in the method and apparatus of this invention.

Figure 4:
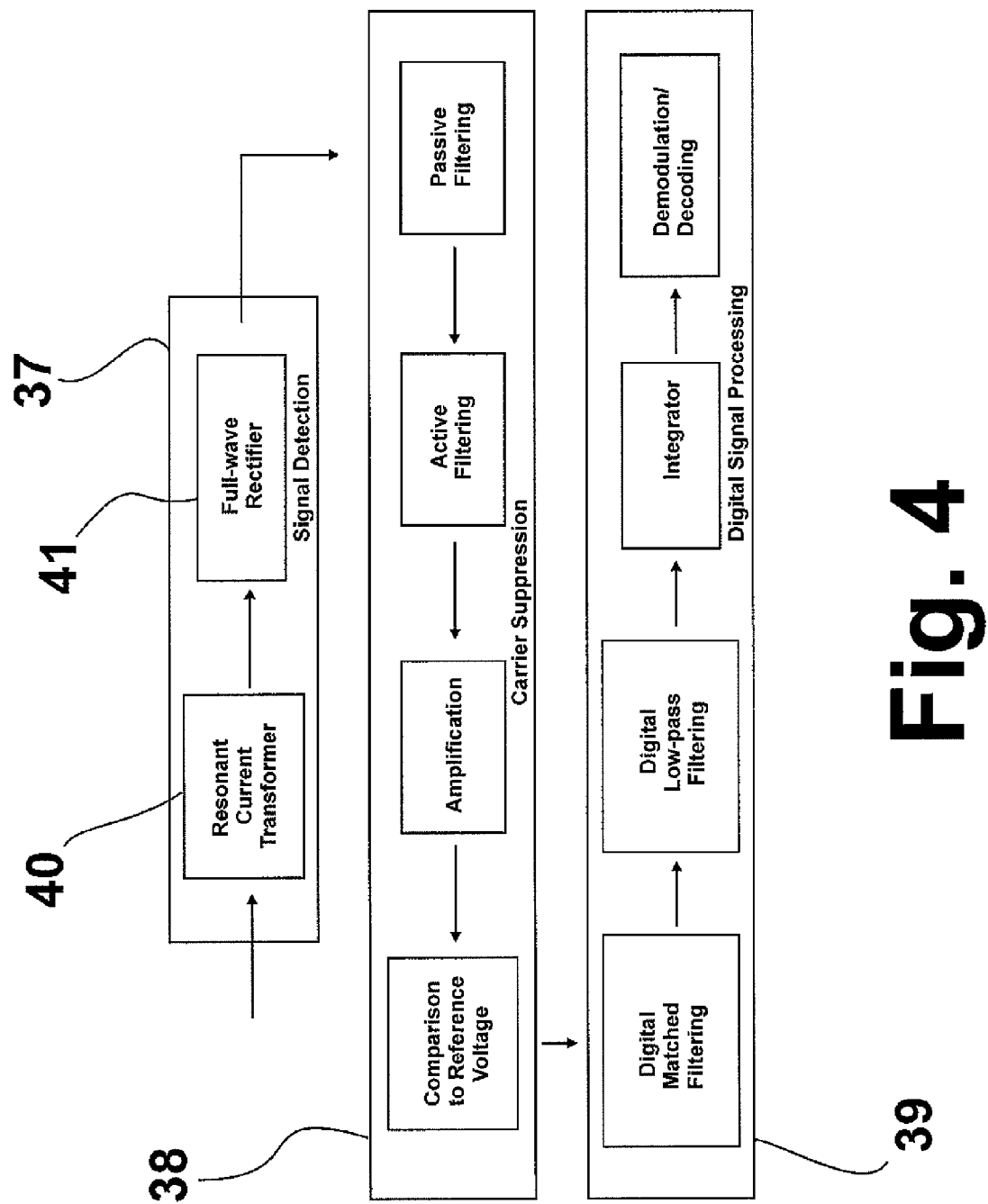
FIG. 4 is a diagram showing the interrogator system flow in accordance with the method of this invention.
Figure 5:
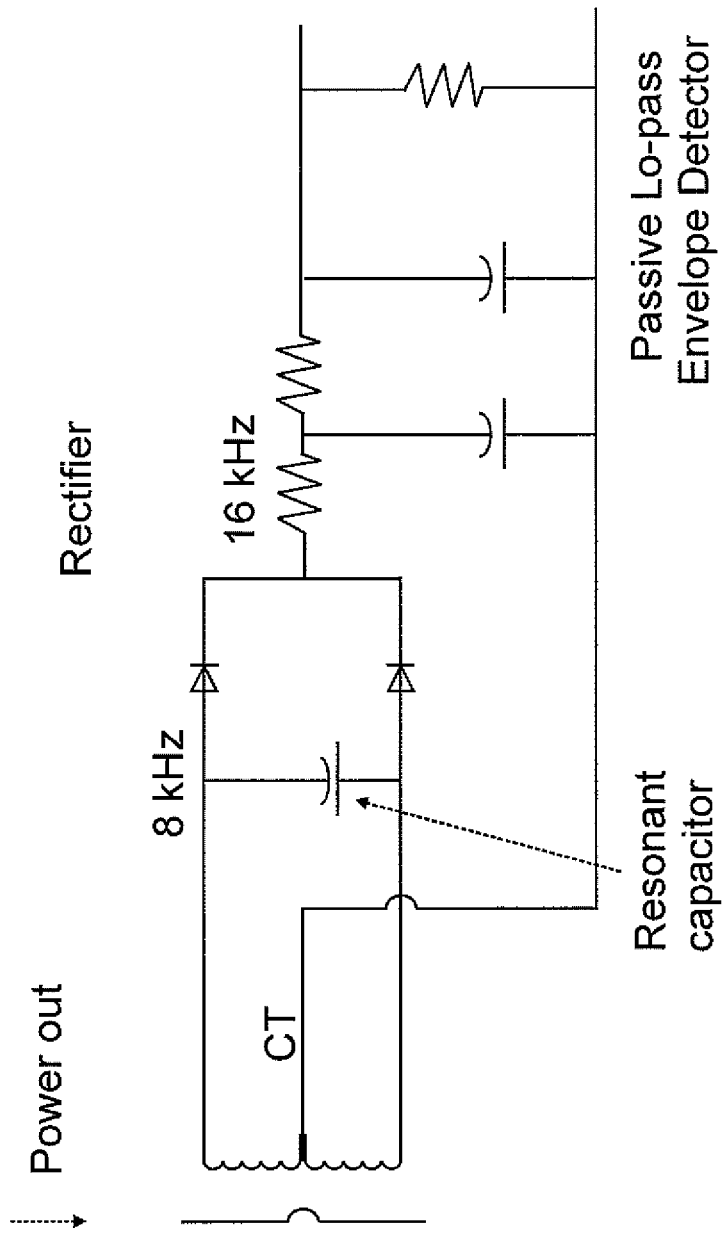
FIG. 5 is a schematic diagram of a high Q circuit for use in accordance with one embodiment of this invention.

The interrogator employed in the method and system of this invention may perform a number of functions including generating the carrier current signal that is placed upon the pipeline, monitoring the power output of the cathodic protection rectifier, balancing the carrier signal power requirements with the cathodic protection current, decoding the backscatter modulation signal from the carrier current signal, storing and time stamping the data received from the remote RFID tag sensors, and addressable two-way communication with multiple RFID tags. Key among these is deciphering the information superimposed on the carrier current signal frequency. FIG. 4 shows a system flow diagram for an interrogator in accordance with one embodiment of this invention. As shown therein, the interrogator comprises three function blocks: signal detection 37, carrier suppression 38, and digital signal processing 39. In accordance with one embodiment of this invention, a high Q circuit, shown in FIG. 5, utilizes a current transformer (CT) 40 tuned to the carrier current frequency. The full-wave rectifier doubles the frequency, making suppressing the carrier simpler. The circuitry in carrier suppression 38 uses a predefined reference voltage to condition the signal for direct use with the microcontroller. This design suppresses the carrier, reduces 60 Hz and environmental noise, preserves the data sequence, and stabilizes the signal at a microcontroller compatible level. The analog signal conditioning is followed by noise filtering and frequency decision making in the digital domain. For example, two low-order Infinite Impulse Response (IIR) filters may be used to discriminate between the two modulation signals. One filter passes the data logic "one" frequency (500 Hz) and the other passes the data logic "zero" frequency (400 Hz). Next, an integrator is used to accumulate the filter outputs to dramatically improve the reliability in bit level distinction. This procedure results in a very low data transmission error rate.

In contrast to conventional practice as previously indicated, the method of this invention utilizes a carrier current that is continuously present. The use of a carrier current frequency of 8 kHz is particularly advantageous because it permits the use of a large body of existing electromagnetic pipe locators to detect the pipe. In addition, construction equipment may be equipped with a passive pipe locator that sends out an alarm when the equipment approaches the pipeline.

One important requirement for the method and system of this invention is that the carrier current superimposed onto the pipeline does not interfere with the cathodic protection of the pipeline. A number of waveforms may be used including a sine wave, a rectified sine wave, and a square wave. Rectified sine waves and square waves are preferred because the voltage does not swing through both polarities. However, resonant coils operate at a single frequency. As is known from Fourier analysis, rectified sine waves and square waves function equivalently as a sum of sine waves with a fundamental frequency and harmonics. Both wave forms have most, but not all, of their energy in the fundamental frequency. Only the portion at the fundamental resonant frequency of the coil is useful for the method of this invention.

Compact breadboards for the interrogator and battery-assisted RFID tag have been made and key features of the system of this invention have been successfully demonstrated on a buried 4-inch diameter steel pipe, where a battery-assisted RFID tag was buried next to the pipeline. In addition to the parameters set forth herein above, we have determined that a communication rate of 5 Baud is sufficient for the communication requirements of the monitoring system; frequency shift keying (FSK) with IEEE P1902.1, a license-free protocol, may be used as the communication protocol; and the RFID tag can encode data from any sensor that outputs a voltage. In addition, the system is capable of two-way communication between multiple RFID tags and the interrogator.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for underground pipeline monitoring comprising the steps of:
    superimposing a continuous alternating electrical current having a current frequency in a range of 1 kHz to 30 kHz onto a generally continuous underground pipeline using an interrogator in electrical contact with the pipeline, producing an alternating magnetic field at said current frequency along said pipeline, wherein the interrogator includes a carrier suppressor and a signal conditioner;
    absorbing an amount of energy from said alternating magnetic field using a network of sensors distributed along said pipeline;
    modulating an impedance of said sensors, producing a modulated sensor impedance;
    detecting said modulated sensor impedance passing through the pipeline with the interrogator from which said continuous alternating electrical current is superimposed onto said pipeline; and
    wherein the carrier suppressor and the signal conditioner allow the interrogator to properly decipher information superimposed on said continuous alternating electrical current.

2. The method of claim 1, wherein said sensors are battery-assisted radio frequency identification tag sensors.

3. The method of claim 1, wherein said impedance is sequentially modulated between a first said modulated sensor impedance and a second said modulated sensor impedance.

4. The method of claim 3, wherein said impedance modulation is carried out at two different modulation rates, one said modulation rate corresponding to a data logic "zero" and another said modulation rate corresponding to a data logic "one".

5. The method of claim 1, wherein said sensors comprise a primary coil and capacitor tuned to a resonant frequency equal to said current frequency and a normally open-circuit secondary coil concentric with said primary coil, said primary coil and said secondary coil connected only by mutual inductance.

6. The method of claim 5, wherein said mutual inductance is activated by electrically shorting said secondary coil.

7. The method of claim 2, wherein a portion of said amount of energy is harvested for powering said sensors.

8. A method for underground pipeline monitoring comprising the steps of:
providing a continuous alternating electrical current at a current frequency in a range of 1 kHz to 30 kHz to an underground pipeline with an interrogator in electrical contact with the underground pipeline, wherein the interrogator includes a carrier suppressor and a signal conditioner;
absorbing a portion of said current with a network of sensors distributed along said pipeline, producing a sensor draw current;
modulating said sensor draw current, producing a modulated sensor current draw;
detecting said modulated sensor current draw on the underground pipeline using detection means of the interrogator from which said continuous alternating current is provided; and
wherein the carrier suppressor and the signal conditioner allow the interrogator to properly decipher information superimposed on said continuous alternating electrical current.

9. The method of claim 8, wherein said sensors are battery-assisted radio frequency identification tag sensors.

10. The method of claim 8, wherein said sensor current draw is modulated between a first said sensor current draw and a second said sensor current draw.

11. The method of claim 8, wherein said sensors comprise a primary coil and capacitor tuned to a resonant frequency equal to said current frequency and a normally open-circuit secondary coil concentric with said primary coil, said primary coil and said secondary coil connected only by mutual inductance.

12. The method of claim 11, wherein said mutual inductance is activated by electrically shorting said secondary coil.

13. The method of claim 11, wherein a portion of said sensor current draw is harvested for powering said sensors.

14. The method of claim 10, wherein said sensor current draw is modulated at two different modulation rates.

15. An underground communication system comprising;
an underground pipeline;
an interrogator including an underground alternating electrical current source, a current draw detection means, a carrier suppressor and a signal conditioner;
the underground alternating electrical current source in electrical contact with said underground pipeline;
a plurality of underground sensors disposed one of proximate to and in contact with said underground pipeline;
the current draw detection means for detecting current draw in the underground pipeline by said underground sensor; and
wherein the underground alternating electrical current source superimposes a continuous alternating electrical current onto the pipeline, the current draw detection means detects a reflected impedance of the underground sensors, and the carrier suppressor and the signal conditioner allow the interrogator to properly decipher information superimposed on said continuous alternating electrical current.

16. The system of claim 15, wherein said underground sensors comprise current draw modulation means for modulating said current draw by said underground sensors.

17. The system of claim 16, wherein said underground sensors are radio frequency identification tag sensors.

18. The system of claim 17, wherein said underground sensors are battery-assisted radio frequency identification tag sensors.

19. The system of claim 18, wherein said current draw modulation means comprises a primary coil and capacitor tuned to a resonant frequency equal to an alternating electrical current frequency provided by said underground alternating electrical current source and a normally open-circuit secondary coil concentric with said primary coil, said primary coil and said secondary coil connected only by mutual inductance, and shorting means for electrically shorting said secondary coil.

20. The system of claim 19, wherein said shorting means comprises a MOSFET.

21. The system of claim 15, wherein said underground alternating electrical current source is disposed within an impressed current rectifier station.

22. The method of claim 1, wherein the pipeline includes a tracer wire.

23. The method of claim 8, wherein the underground pipeline includes a tracer wire.

24. The system of claim 15, wherein the underground pipeline includes a tracer wire.

* * * * *